(12) United States Patent
Park et al.

(10) Patent No.: US 8,697,281 B2
(45) Date of Patent: Apr. 15, 2014

(54) BATTERY ASSEMBLY

(75) Inventors: Kyung-Ho Park, Yongin-si (KR);
Seok-Ryun Park, Yongin-si (KR); Seok Koh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 571 days.

(21) Appl. No.: 12/875,962

(22) Filed: Sep. 3, 2010

(65) Prior Publication Data

US 2011/0091747 A1    Apr. 21, 2011

Related U.S. Application Data

(60) Provisional application No. 61/253,761, filed on Oct. 21, 2009.

(51) Int. Cl.
*H01M 2/06* (2006.01)
*H01M 2/20* (2006.01)

(52) U.S. Cl.
USPC ................................ 429/211; 429/7; 429/100

(58) Field of Classification Search
USPC ............................................. 429/7, 100, 211
See application file for complete search history.

(56) References Cited

U.S. PATENT DOCUMENTS

| | | | |
|---|---|---|---|
| 2005/0112415 A1* | 5/2005 | Takeshita et al. | 429/7 |
| 2008/0254356 A1 | 10/2008 | Liersch et al. | |
| 2008/0280200 A1* | 11/2008 | Takahashi et al. | 429/179 |
| 2009/0081485 A1 | 3/2009 | Heo | |
| 2009/0104516 A1 | 4/2009 | Yoshihara et al. | |
| 2009/0246621 A1 | 10/2009 | Miebori | |
| 2009/0258285 A1 | 10/2009 | Kim | |
| 2009/0325042 A1 | 12/2009 | Koetting et al. | |
| 2010/0196752 A1 | 8/2010 | Yue et al. | |

FOREIGN PATENT DOCUMENTS

| | | |
|---|---|---|
| CN | 101030633 A | 9/2007 |
| CN | 101393996 A | 3/2009 |
| CN | 101557012 A | 10/2009 |
| EP | 2 006 934 A2 | 12/2008 |
| JP | 2006-164579 | 6/2006 |

(Continued)

OTHER PUBLICATIONS

Office Action dated Aug. 14, 2012 for corresponding KR Application No. 10-2010-0085950.

(Continued)

*Primary Examiner* — Jonathan G Leong
*Assistant Examiner* — James Erwin
(74) *Attorney, Agent, or Firm* — Knobbe, Martens, Olson & Bear, LLP (57) ABSTRACT

The embodiment provides a battery assembly or pack that can fix a coupling tap to an exact position by closely adhering a plurality of bare cells without flowing when the plurality of bare cells are welded with the coupling tap. The battery assembly according to the embodiment includes: a plurality of bare cells that have electrode terminals formed on upper surfaces thereof; an internal frame that receives the plurality of bare cells and has an internal terminal exposing part that exposes the electrode terminals; and a coupling tap that is seated on the internal terminal exposing part of the internal frame to couple the plurality of electrode terminals, wherein a rib hanger that fixes the coupling tap is further formed on the upper of the internal frame. With the constitution as described above, defects of a product are reduced, making it possible to improve productivity.

15 Claims, 6 Drawing Sheets

(56) References Cited

FOREIGN PATENT DOCUMENTS

| | | |
|---|---|---|
| JP | 2009-043462 | 2/2009 |
| JP | 2009-176690 | 8/2009 |
| JP | 2009-193783 | 8/2009 |
| JP | 2009-530777 | 8/2009 |
| KR | 10-2006-0062006 | 6/2006 |
| KR | 2007-0043496 | 4/2007 |
| KR | 10-2009-0031158 | 3/2009 |
| KR | 2009-0051590 | 5/2009 |
| KR | 2009-0064028 | 6/2009 |
| KR | 2009-0064089 | 6/2009 |
| KR | 10-2009-0106835 | 10/2009 |
| KR | 2009-0108417 | 10/2009 |
| WO | WO 2007/033689 | 3/2007 |
| WO | WO 2007/107036 A1 | 9/2007 |

OTHER PUBLICATIONS

Office Action dated Nov. 20, 2012 for corresponding JP Application 2010-236527.
Extended European Search Report dated Feb. 23, 2011 for corresponding EP Application No. 10251291.0-2119.
Office Action dated Apr. 13, 2013 for corresponding JP Application No. 2010-236527.
Office Action dated Mar. 5, 2013 for corresponding CN Application No. 201010514446.8.
Office Action dated Feb. 6, 2013 for corresponding KR Application No. 10-2010-0085950.

\* cited by examiner

BATTERY ASSEMBLY

RELATED APPLICATIONS

This application claims the benefit of U.S. Provisional Application No. 61/253,761, filed Oct. 21, 2009, entitled BATTERY PACK which is hereby incorporated by reference in its entirety herein.

BACKGROUND

1. Field of the Invention

The embodiment relates to a battery assembly, and more particularly, to a battery assembly that can fix a coupling tap when a plurality of bare cells are welded with the coupling tap.

2. Discussion of Related Art

The bare cell includes an electrode assembly comprised of a cathode plate, an anode plate, and a separator interposed therebetween that is positioned within a can with an electrolyte. The bare cell also includes a cap assembly and seals the upper end of the can. An electrode terminal electrically coupled to the anode plate of the electrode assembly extends out of the can into the upper of the cap assembly.

The cap assembly includes a coupling tap that is commonly formed of a stiff plate-shaped metal piece that is shaped so that the corresponding portion of the coupling tap positioned on the electrode terminals of the plurality of bare cells can be electrically coupled to the electrode terminals by welding, soldering, and mechanical engagement.

At this time, when the coupling tap is positioned on the plurality of electrode terminals in order to couple the plurality of bare cells, the plurality of bare cells are not fixed and non-movable. This creates a problem in that it is difficult for the coupling tap to be engaged with the electrode terminals in an exact position. Moreover, since there is no separate fixing member that can fix the plurality of bare cells to the coupling tap, the coupling tap itself may be distorted or bent. This creates a problem in that a plurality of defects are generated when the bare cell is manufactured.

SUMMARY OF THE INVENTION

The embodiment provides a battery assembly or pack in which a projection rib is formed on a coupling tap, for coupling a plurality of bare cells, and a rib hanger is formed in an internal frame receiving the plurality of bare cells to allow the plurality of bare cells to be closely adhered without flowing when the plurality of bare cells are welded with the coupling tap, thereby making it possible to fix the coupling tab to an exact position.

According to one aspect of the embodiment, there is provided a battery assembly or pack including: a plurality of bare cells that have electrode terminals formed on upper surfaces thereof; an internal frame that receives the plurality of bare cells and has an internal terminal exposing opening that exposes the electrode terminals; and a coupling tap that is seated on the internal terminal exposing opening of the internal frame to couple the plurality of electrode terminals, wherein a rib hanger that fixes the coupling tap is further formed on the upper of the internal frame.

In another aspect, the invention comprises a battery assembly comprising at least one bare cell having a first surface and an electrode terminal extending from the first surface. The assembly further comprises a first frame that receives the at least one bare cell, wherein the first frame defines an opening that is positioned such that when the first frame is positioned adjacent the first surface, the electrode terminal of the at least one bare cell is exposed within the opening and wherein the first frame defines at least one side wall positioned proximate to the opening. The assembly further comprises a coupling tap that is engaged with the first frame so as to be positioned proximate the opening, wherein the coupling tap includes a contact part that contacts the electrode terminal and a projection part that engages with the at least one side wall so as to maintain the coupling tap in proximity to the electrode terminal.

Moreover, the coupling tap may include a terminal contacting part that contacts the electrode terminals and a pair of vertical ribs that are extended vertically from both ends of the terminal contacting part.

Furthermore, the pair of vertical ribs each may be further formed with projection ribs that are extended in opposite directions.

In addition, the electrode terminals may be coupled to the coupling tap by welding.

Moreover, the rib hanger may be formed on the inner side of the frame extending part extended upward the internal frame.

Furthermore, a groove part into which a welding rod is inserted when the electrode terminals are welded with the coupling tap may be formed in one area of the frame extending part.

In addition, the bare cells may be forcibly put into the internal frame to be received.

As described above, the projection rib is formed on the coupling tap that couples the plurality of bare cells and the rib hanger is formed on the internal frame that receives the plurality of bare cells to closely adhere the plurality of bare cells without flowing when the plurality of bare cells are welded with the coupling tap so that the coupling tap can be fixed on the exact position to reduce defects of the product, making it possible to improve productivity.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION OF THE INVENTION

Hereinafter, a battery assembly or pack according to the embodiment will be described in detailed with reference to the accompanying drawings.

Figure 1:
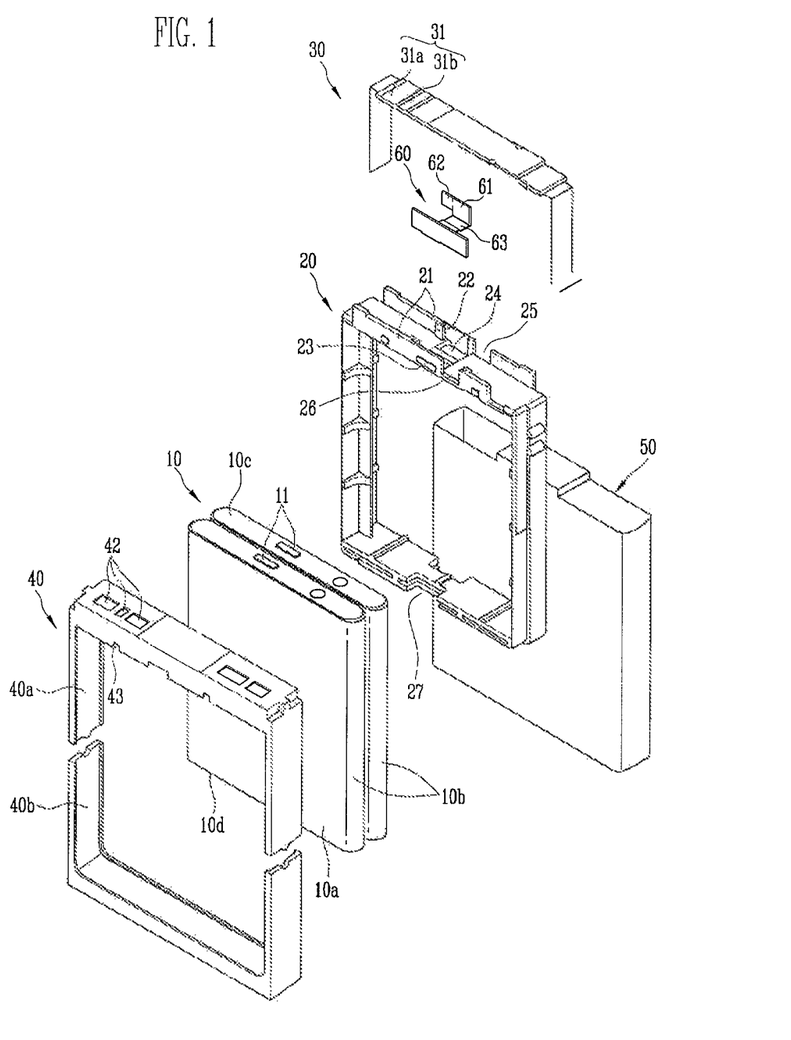
FIG. 1 is an exploded perspective view of a battery assembly according to an embodiment of the present invention.

FIG. 1 is an exploded perspective view of a battery assembly according to an embodiment of the present invention.

Referring to FIG. 1, the battery assembly according to the embodiment of the present invention includes a pair of bare cells 10 configured of an electrode assembly (not shown) and a can surrounding the outer circumferential surface thereof, a protective circuit module 30 electrically coupled to the bare cells 10, an internal frame 20, an external frame 40, and a taping member 50. The embodiment shows a can type secondary battery but it is not limited thereto.

The bare cells 10 whose electrode terminals 11 are exposed on their upper surfaces 10c include the electrode assembly and the can receiving the electrode assembly, wherein the electrode assembly includes an cathode plate whose both surfaces are coated with cathode active material, a separator, and a anode plate whose both surfaces are coated with anode active material.

Electrode taps are joined to areas extended from the respective cathode plate and anode plate. One of the electrode taps is coupled to a can or a cap plate and the other is coupled to the electrode terminal 11 so that the electrode terminal 11 is exposed to the outside of the can to be electrically coupled to the protective circuit module 30.

The protective circuit module 30 includes an electrical connection terminal (not shown) installed for the electrical connection with the electrode terminals 11, and further includes an external input/output terminal part 31 on the upper thereof.

The internal frame 20 is formed in a rectangular or '☐' shape so that the respective long side surfaces 10a of the pair of bare cells 10 are exposed one by one, wherein the internal frame 20 may be formed in the same shape as the external appearance of the bare cell 10 so that the pair of bare cells 10 are forcibly put to be inserted.

An internal terminal exposing part or opening 24 is further formed on the upper of the internal frame 20 so that the electrode terminal 11 of the bare cell 10 is exposed, and a frame extending part 21 is further formed on the upper of the internal frame 20. In other words, the frame extending part 21 is extended from the pair of sides of the internal frame 20 contacting the upper surface 10c of the bare cell 10 to the outer side of the bare cell 10.

Further, rib hangers or slots 22 for fixing the coupling tap 60 are further formed on the respective inner sides of the frame extending part 21 to allow the electrode terminal 11 and the coupling tap 60 to be more easily welded. Also, at the lower unit of the internal frame 20, a pair of concave units 27 that face each other is formed. The concave units 27 are formed so that the bare cell 10 is easily inserted or withdrawn into the internal frame 20.

Although the internal frame 20 according to one embodiment of the present invention is formed in a rectangular or '☐' shape that the pair of long side surfaces 10a of the bare cell 10 are exposed, the internal frame 20 may also be formed in a Cee or '⊏' shape so that the pair of long side surfaces 10a and the lower surface 10d of the bare cell 10 are exposed.

The coupling tap 60 that couples the pair of electrode terminals 11 is seated adjacent the internal terminal exposing unit or opening 24 of the internal frame 20. The coupling tap 60 includes a terminal contacting part 63 that contacts the electrode terminals 11, a pair of vertical ribs 61 that are vertically extended from both ends of the terminal contacting part 63, and a projection rib 62 that is extended in opposite directions from the respective vertical ribs 61. Furthermore, the coupling tab 60 is electrically connected to the protective circuit module 30. For this purpose, the lead member (not shown) can be further included between the coupling tab 60 and the protective circuit module 30. One end of the lead member is connected to the coupling tab 60, and the other end of the lead member withdrawn through the groove unit or opening 26 can be connected to the protective circuit module 30.

The external frame 40 is coupled to the bare cell 10 electrically coupled to the protective circuit module 30 having the internal frame 20 therebetween as described above, in order to form a portion of the external appearance of the battery assembly.

The external frame 40 is formed by an inter-coupling of an upper external frame 40a and a lower external frame 40b that are separately provided but the external frame 40 may be formed in an integrated form. And, the outer side of the external frame 40 is surrounded by the taping member 50, making it possible to reinforce adhesion between the bare cell 10 and the external frame 40.

For improving coherence between the internal frame 20 and the external frame 40, a projecting unit 23 is formed at the internal frame 20, and the projecting unit 23 and a projection hanger 43 are formed in a position that correspond to each other. The groove unit 25 that is not explained is a space in which the welding rod is inserted when the coupling tab 60 and the electrode terminal of the bare cells 10 are welded.

Figure 2:
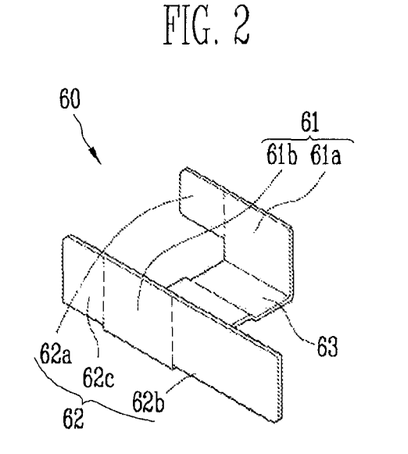
FIG. 2 is a perspective view of a coupling tap according to the embodiment of the present invention.

FIG. 2 is a perspective view of a coupling tap according to the embodiment of the present invention.

Referring to FIG. 2, the coupling tap 60, which is seated on the internal terminal exposing part 24 of the internal frame 20 to electrically connects the pair of electrode terminals 11 of the bare cell 10, includes a terminal contacting part 63 that contacts the electrode terminals 11 and a pair of vertical ribs 61a and 61b that are vertically extended from both ends of the terminal contacting part 63. And, the coupling tap 60 further includes a first projection rib 62a and a second projection rib 62b that are extended in opposite directions from the respective vertical ribs 61.

In other words, the first projection rib 62a may be extended in the left side of one vertical rib 61a and the second projection rib 62b may be extended in the right side of the other vertical rib 61b. Furthermore, a third projection rib 62c that is extended in the left side may also be formed on the other vertical rib 61b. The projection ribs 62a, 62b, and 62c as above are inserted into the rib hanger 22 of the internal frame 20, making it possible to fix the coupling tap 60.

Figure 3A:
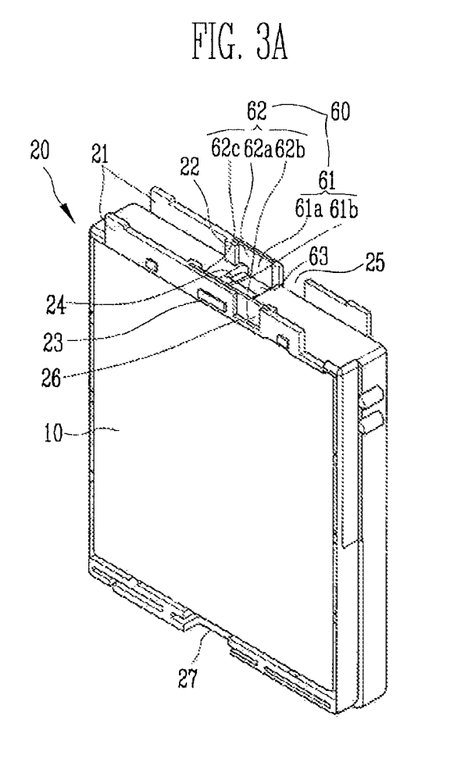
FIG. 3A is a perspective view showing a state where an internal frame and a coupling tap according to the embodiment of the present invention are coupled.
Figure 3B:
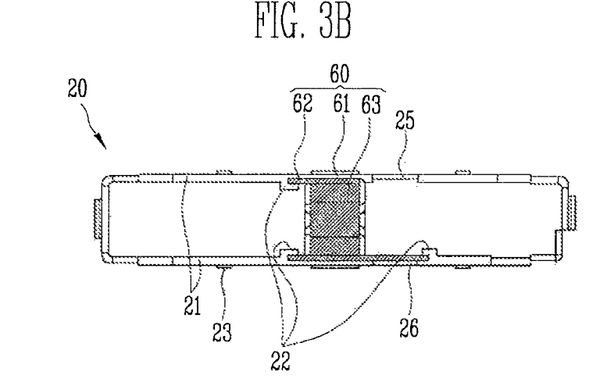
FIG. 3B is a plan view showing a state where the internal frame and the coupling tap according to the embodiment of the present invention are coupled.

FIG. 3A is a perspective view showing a state where an internal frame and a coupling tap according to the embodiment of the present invention are coupled, and FIG. 3B is a plan view showing a state where the internal frame and the coupling tap according to the embodiment of the present invention are coupled.

Referring to FIGS. 3A and 3B, the coupling tap 60 is seated on the internal terminal exposing part 24 to be coupled in a state where the respective bare cells 10 are forcibly put into the internal frame 20 so that one long side surface 10 of each bare cell 10 is exposed. More specifically, the terminal contacting part 63 of the coupling tab 60 is seated adjacent the internal terminal exposing part or opening 24, and the vertical rib 61 is positioned to be internally contacted to the frame extending part 21 of the internal frame 20. Herein, the frame extending part 21 is the area that is extended from a pair of sides of the internal frame 20 contacting the upper surface 10c of the bare cell 10 to the outer side direction of the bare cell 10.

And, the projection rib 62 is hanged by the rib hanger 22 formed on the inner side of the frame extending part 21. Therefore, the coupling tap 60 is fixed onto the internal terminal exposing part 24 to be electrically coupled to the electrode terminals 11 (see FIG. 1) of the bare cells 10, and at this time, the coupling tap 60 is seated in an inserted shape on the upper of the internal frame 20.

Herein, the electrode terminals 11 of the bare cells 10 and the coupling tap 60 can be coupled to each other by welding. As the projection rib 62 is hanged by the rib hanger 22, the coupling tap 60 can be welded on the exact position of the electrode terminal 11. And, a welding groove part or opening 25 into which a welding rod is inserted is formed on one area of the frame extending part 21 of the internal frame 20, making it possible to more easily perform welding of the plurality of bare cells 10 and the coupling tap 60.

Moreover, a groove part or opening 26 may further be formed on the frame extending part 21 opposed to the welding groove part or opening 25. This is the space where the coupling tap 60 is safely seated on the terminal exposing part or opening 24, while holding the coupling tap 60 to the last, when coupling the coupling tap 60 into the internal frame 20.

Herein, since the first projection rib 62a is extended only in the left side in one vertical rib 61a of the coupling tap 60, it cannot but block the welding groove part or opening 25. Also, since the respective second projection rib 62b and third projection rib 63b are extended into both sides in the other vertical rib 61b of the coupling tap 60, the coupling tap 60 can be inserted in the direction of the internal frame 20, while holding the second projection rib 62b positioned in the groove part or opening 26.

The internal frame 20 is formed in a rectangular or '☐' shape and disposed so that the long side surfaces 10a face each other of the pair of bare cells 10, that is, the long side surfaces 10a of the pair of bare cells 10 are exposed one by one. At this time, the internal frame 20 is formed in a shape matching with the external appearance of the bare cell 10 so that the bare cell 10 is forcibly put into the internal frame 20 to be assembled. And, even after the bare cell 10 is coupled to the internal frame 20, the internal terminal exposing part or opening 24 is formed on the upper of the internal frame 20 so that the electrode terminal 11 is exposed.

Figure 4A:
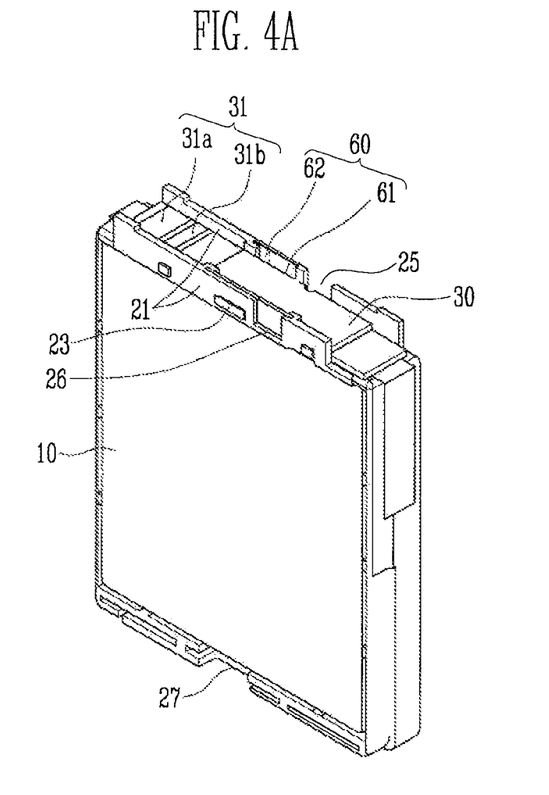
FIG. 4A is a perspective view of a core pack according to the embodiment of the present invention.

FIG. 4A is a perspective view of a core pack according to the embodiment of the present invention.

Referring to FIG. 4A, the protective circuit module 30 is seated on the upper surface of the internal frame 20 with which the bare cells 10 and the coupling tap 60 are coupled. Herein, the protective circuit module 30 may be attached to the internal frame 20 by welding or an insulation tape.

The coupling tap 60 is electrically connected with the protective circuit module 30 seated on the internal frame 20 but the internal frame 20 is positioned between the bare cells 10 and the protective circuit module 30 to isolate area other than the coupling tap 60. The protective circuit module 30 is electrically connected with the coupling tap 60 simultaneously with being physically coupled therewith and includes a printed circuit board (drawings' reference numeral thereof is not shown). The printed circuit board is formed with a protective circuit such as a circuit make a charge state uniform by controlling charge and discharge of a battery or a circuit preventing overdischarge and overcharge.

Furthermore, the protective circuit module 30 may include a protective device such as a thermistor or a temperature fuse. These block current when voltage and current of a battery become higher than the prescribed voltage and current due to temperature rising or excessive charge/discharge of the battery, thereby preventing danger such as breakage of the battery, firing, etc. Moreover, the protective circuit module 30 includes an electrical connecting terminal (not shown) installed on the printed circuit board for an electrical connection with the coupling tap 60.

The protective circuit module 30 as above, which transmits and receives electrical signals between the bare cell 10 and an external equipment (not shown), further includes an external input/output terminal part 31 formed on the upper thereof, the external input/output terminal part 31 functioning as an electrical medium between the protective circuit module 30 and the external equipment.

The external input/output terminal part 31 includes a metal part 31a and a housing part 31b surrounding the metal part 31a. The metal part 31a is plated with gold (Au) that is conductive material to serve to allow the electrical signals to be flowed between the bare cell 10 and the external equipment. The housing part 31b is formed of plastic material that is insulation material to serve to isolate the metal parts 31a from each other, the metal parts 31a being interposed between the housing parts 31b at a predetermined interval.

Figure 4B:
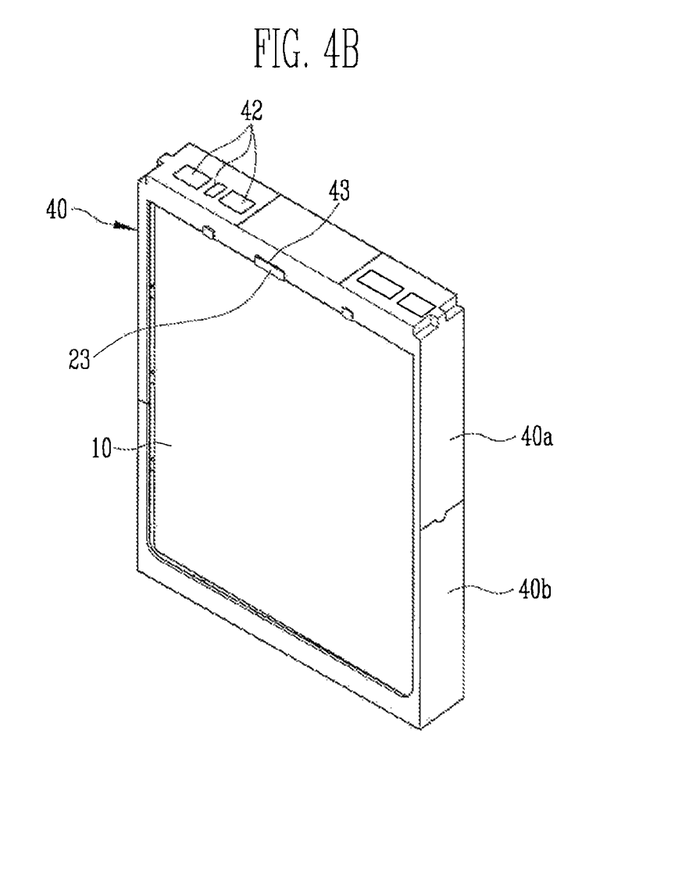
FIG. 4B is a perspective view showing a state where an external frame is assembled outside of the core pack according to the embodiment of the present invention.

FIG. 4B is a perspective view showing a state where an external frame is assembled outside of the core pack according to the embodiment of the present invention.

Referring to FIG. 4B, as the upper external frame 40a and the lower external frame 40b are separately provided to be inter-coupled, the external frame 40 can surround and receive the bare cell 10 mounted with the protective circuit module and the internal frame. And, an external terminal exposing part 42 that exposes the external input/output terminal part 31 to the outside may further be provided in the external frame 40.

In the embodiment of the present invention, the external frame 40 is formed by inter-coupling the upper external frame 40a and the lower external frame 40b that are separately provided, but the external frame 40 may also be formed in a rectangular or '☐' shaped integrated form so that a pair of long side surfaces 10a of the bare cell 10 are exposed.

Herein, the internal frame 20 serves to isolate the bare cell 10 from the protective circuit module 30, and the external frame 40 is installed for the outline shape and strength of the battery assembly. The internal frame 20 and the external frame 40 as above may be formed of any one selected from the group consisting of Polycarbonate (PC), Polyethylene Terephthalate Glycol (PETG), PolyEthylene (PE), PolyPropylene (PP), and Acronitrili-Butadiene-Styren (ABS). When the external frame 40 is formed in the rectangular or '☐' shaped integrated form thereby, the external frame 40 can be easily assembled with the internal frame 20 by some elasticity generated from the material.

Figure 4C:
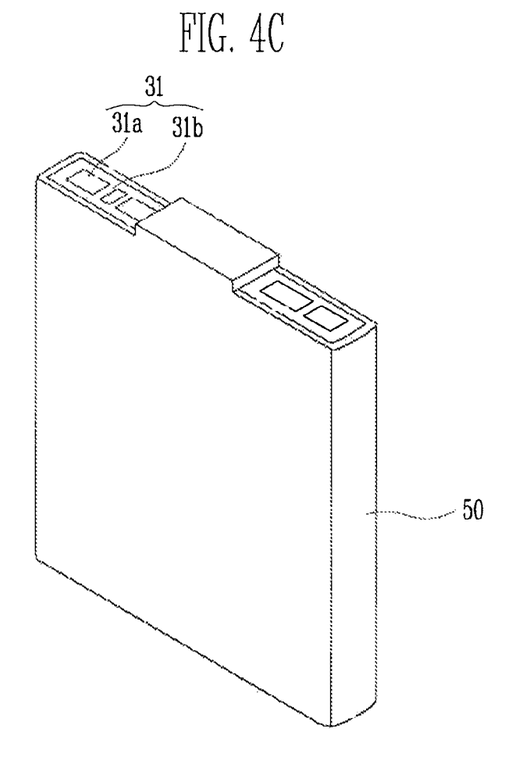
FIG. 4C is a perspective view of the battery assembly according to the embodiment of the present invention.

FIG. 4C is a perspective view of the battery assembly with pack according to the embodiment of the present invention.

Referring to FIG. 4C, after the core pack is assembled with the external frame 40, a taping member 50 can surround the outer side thereof. The taping member 50 is used for reinforcing the coupling state of the core pack and the external frame 40, wherein it may have a shape where only an engagement part between the external frame 40 and the core pack is locally surrounded or a single sheet shape where the entirety of the outer surfaces of the external frame 40 and the core pack is surrounded. Herein, the shape of the taping member 50 is not limited.

The taping member 50 may be a packaging label including protection, insulation, etc. function of a secondary battery as well as may be printed with discharge capacity or manufacturing date of the secondary battery. Although synthetic resin or paper, etc. that is commonly used as packaging material may be used as the material of the packaging label, the use of a contraction tube is preferable.

As described above, the projection rib 62 is formed on the coupling tap 60 that connects the plurality of bare cells 10 and the rib hanger 22 is formed on the internal frame 20 that receives the plurality of bare cells 10, making it possible to closely adhere the plurality of bare cells 10 without flowing when the plurality of bare cells 10 are welded with the coupling tap 60. Moreover, the coupling tap 60 can be fixed on the exact position to reduce defects of the product, making it possible to improve productivity.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery assembly comprising:
    at least one bare cell having a first surface and an electrode terminal extending from the first surface;
    a first frame that receives the at least one bare cell, wherein the first frame defines an opening that is positioned such that when the first frame is positioned adjacent the first surface, the electrode terminal of the at least one bare cell is exposed within the opening and wherein the first frame defines a first and a second side wall and a bottom surface interconnecting the first and second side walls with the opening formed in the bottom surface so that the electrode terminal is exposed in the opening wherein the first and second side walls define a space;
    a coupling tap that is engaged with the first frame so as to be positioned proximate the opening, wherein the coupling tap includes a contact part that contacts the electrode terminal through the opening and a first and a second projection part that are positioned and dimensioned to have planar surfaces that extend parallel to the first and second side walls when the contact part engages with the electrode terminal through the opening wherein the first and second projection parts engages with the first and second side walls respectively so as to maintain the coupling tap in proximity to the electrode terminal; and
    a protective circuit module that engages with the coupling tap that is positioned within the space, wherein the planar surfaces of the first and second projection parts are interposed between the first and second side walls and the protective circuit module.

2. The battery assembly of claim 1, wherein the first side wall includes an opening that is positioned to permit access to the interface between the coupling tap and the electrode terminal for welding.

3. The battery assembly of claim 2, wherein the second side wall includes an opening that permits a lead member to be withdrawn through the opening.

4. The battery assembly of claim 1, wherein the first and second side walls define slots that are positioned to receive edges of the coupling tap so that when the edges of the coupling tap are positioned within the slots, the contact part is retained in proximity to the electrode terminal.

5. The battery assembly of claim 4, wherein the first and second side walls define inner surfaces that face each other and wherein the slots are formed on the inner surface of the first and second side walls.

6. The battery assembly of claim 4, wherein the coupling tap has a first and a second vertical ribs that extend in a direction substantially parallel to the first and second side walls so as to be engaged therewith and wherein the first and second vertical ribs extend in a direction that is substantially perpendicular to the contact part of the coupling tap.

7. The battery assembly of claim 5, wherein the coupling tap further includes a first and second projection members that extend outward from a first and a second vertical ribs so as to engage with the first and second side walls to retain the coupling tap proximate the electrode terminal.

8. The battery assembly of claim 6, wherein a first projection member extends in a first direction from the first vertical rib and wherein a second projection member extends in the second direction from the first vertical rib, which is parallel to the first direction from the second vertical rib.

9. The battery assembly of claim 7, wherein the second side wall includes an opening and the second projection member is positioned within the opening in the second side wall.

10. The battery assembly of claim 7, wherein a third projection member extends in a first direction, opposite the second direction, from the first vertical rib.

11. The assembly of claim 1, further comprising a protective circuit module that is positioned adjacent the at least one side wall so that the protective circuit module is coupled to the electrode terminal via the coupling tap and is insulated from the bare cell by the first frame.

12. The assembly of claim 1, further comprising a second frame that has an opening that receives the bare cell, the first frame and the protection circuit module.

13. The assembly of claim 12, wherein the first frame includes a projecting unit formed in a first location and wherein the second frame includes a projection hanger formed in a second location corresponding to the first location so that when the first and second frames are assembled together, the projection unit engages with the projection hanger so as to align the first and second frames with each other.

14. The assembly of claim 13, wherein the second frame is comprised of a first and a second subframe members that are coupled together to form the second frame.

15. The battery assembly of claim 1, wherein the first frame includes at least one concave portion formed in an outer surface of the first frame to allow for insertion or extraction of the at least one bare cell into or from the first frame.

* * * * *